(12) United States Patent
Rowley et al.

(10) Patent No.: US 7,277,957 B2
(45) Date of Patent: Oct. 2, 2007

(54) METHOD OF RECONSTRUCTING NETWORK COMMUNICATIONS

(75) Inventors: Bevan S. Rowley, Lehi, UT (US); Stephen G. Huntington, Roy, UT (US)

(73) Assignee: McAfee, Inc., Santa Clara, CA (US)

(*) Notice: Subject to any disclaimer, the term of this patent is extended or adjusted under 35 U.S.C. 154(b) by 729 days.

(21) Appl. No.: 10/191,933

(22) Filed: Jul. 9, 2002

(65) Prior Publication Data
US 2003/0028662 A1 Feb. 6, 2003

Related U.S. Application Data

(60) Provisional application No. 60/306,792, filed on Jul. 20, 2001, provisional application No. 60/306,107, filed on Jul. 17, 2001, provisional application No. 60/306,056, filed on Jul. 17, 2001, provisional application No. 60/306,106, filed on Jul. 17, 2001.

(51) Int. Cl.
*G06F 15/16* (2006.01)

(52) U.S. Cl. ............ 709/231; 709/223; 709/224; 709/230

(58) Field of Classification Search ............ 709/231, 709/224, 223; 370/241; 713/200, 201; 714/39, 714/447
See application file for complete search history.

(56) References Cited

U.S. PATENT DOCUMENTS

| | | | |
|---|---|---|---|
| 5,166,928 A * | 11/1992 | Nishioka et al. ............ 370/421 |
| 5,586,264 A * | 12/1996 | Belknap et al. ............ 725/115 |
| 5,760,767 A | 6/1998 | Shore et al. ............ 715/723 |
| 5,933,602 A * | 8/1999 | Grover ............ 709/224 |
| 6,219,050 B1 | 4/2001 | Schaffer ............ 715/853 |
| 6,236,396 B1 | 5/2001 | Jenson et al. ............ 715/764 |
| 6,278,694 B1 | 8/2001 | Wolf et al. ............ 370/253 |
| 6,453,345 B2 * | 9/2002 | Trcka et al. ............ 709/224 |
| 6,529,954 B1 | 3/2003 | Cookmeyer et al. ............ 709/224 |
| 6,593,942 B1 | 7/2003 | Bushmitch et al. ............ 715/721 |
| 6,708,292 B1 | 3/2004 | Mangasarian ............ 714/39 |
| 6,826,639 B2 | 11/2004 | Pasumansky et al. ............ 710/105 |
| 2001/0014211 A1 * | 8/2001 | Morinaga ............ 386/111 |
| 2001/0039579 A1 | 11/2001 | Trcka et al. ............ 709/224 |
| 2002/0173857 A1 | 11/2002 | Pabari et al. ............ 700/1 |

OTHER PUBLICATIONS

Office Action Summary from U.S. Appl. No. 10/199,168 which was mailed on Aug. 17, 2005.
Office Action Summary from U.S. Appl. No. 10/199,420 which was mailed on Oct. 5, 2005.
Office Action Summary from U.S. Appl. No. 10/199,420 which was mailed on Mar. 8, 2006.

\* cited by examiner

*Primary Examiner*—Yves Dalencourt
(74) *Attorney, Agent, or Firm*—Zilka-Kotab, PC; Christopher J. Hamaty (57) ABSTRACT

A method for reconstructing network communication sessions is disclosed. The packets comprising the communication are captured and sorted into a sorted list. The sorted packets are decoded and the information from those packets is used to reconstruct the content and context of the network communication. The reconstructed communication is then displayed on a computer monitor using a web browser or other display program. The user is provided with commands to facilitate navigation of the reconstructed network communication.

38 Claims, 9 Drawing Sheets

```
Get /test/data.gif HTTP 1.1
Accept: */*
Referrer: 216.230.45.312/link1/129_?prto=34&todp=temp
Accept-Language: en-us
Accept-Encoding: gzip, deflate
User-Agent: Mozilla/4.0 (Compatible; MSIE 5.5; Windows 98; Win 9x 4.90)
Connection: Keep-Alive HTTP/1.1 200 OK
Server : Microsoft-IIS/5.0
Date: Thu, 10 May 2001 20:58:25 GMT
Content-Type: image/gif
Accept-Ranges: none
Transfer-Encoding: chunked
Cache-Control: no-cache
```

Figure 9

METHOD OF RECONSTRUCTING NETWORK COMMUNICATIONS

This application claims the benefit of U.S. Provisional Application No. 60/306,107 filed Jul. 17, 2001, the benefit of U.S. Provisional Application No. 60/306,056 filed Jul. 17, 2001, the benefit of U.S. Provisional Application No. 60/306,106 filed Jul. 17, 2001, and the benefit of U.S. Provisional Application No. 60/306,792 filed Jul. 20, 2001.

BACKGROUND OF THE INVENTION

This invention relates generally to processes for reconstructing network communication sessions using previously stored network packets and, in particular, world wide web browsing sessions that use the TCP/IP communications protocol.

Computer networks have been a boon to information sharing in modem society. Computer users are able to access network resources for useful data and to communicate with other computer users. These networks include local area networks, company wide networks, and wide area networks including the vast world wide web.

Computer users access and exchange massive amounts of data with other users and with network servers and web servers, including email, text files, web pages, and a variety of binary objects such as audio and video. Networks and the worldwide web have developed tremendously over the last few years to provide constantly changing and updated information and even the ability to dynamically create and distribute web pages and other information from real-time data. While real-time changes and dynamic information provide many benefits; they also create an inability to retrieve information in the future that is identical to information from the same source as a past communication.

The ability to reconstruct network communications from raw, stored or captured data is useful because it allows after-the-fact review of dynamically changing information, determination of which network nodes sent and received data, the then-current data sent or received, times of all transmissions or receptions, visualization of the communication, or other analysis. Although the ability exists to download the content and structures of network files and web sites, there is no ability to recreate an actual communication session between a computer user and network sources. Therefore, a need has arisen to capture and store network communications as they occur and to reconstruct the actual network communication as it had previously taken place with respect to the identity of a computer, timing, and content.

SUMMARY OF THE INVENTION

According to the present invention, a method is provided that satisfies the need to reconstruct actual network communications. The method permits control of the display of the content of actual web sessions, the ability to control the display of web sessions, and recreation of files transported over a network. The method may be used to recreate both previously stored and real-time network communications.

The first step is to collect or capture the packets in transit over a network. This may be accomplished using known technology, such as a network packet capture device or sniffer. The packets are stored on a storage medium, such as a hard drive or in memory, for analysis and use.

A computer processor selects a portion of the packets, typically by selecting packets captured by the sniffer during a given time interval. The selected packets are read sequentially from the storage, that is, a first packet is read and decoded. If the packet is either a request or a response, the packet is added to a sorted list, preferably using the Transaction Control Protocol/Internet Protocol (TCP/IP) address and port number. The next packet is then read and decoded, and processed in the same way, until all of the selected packets have been processed.

According to the method, the computer program next recreates a communication that occurred between a computer and the network. This is performed by first retrieving a packet from the sorted list that is associated with the communication in question. If the packet is a request packet or other initiation packet, the request information may be stored as raw data or as formatted data, that is, in data structures for later use. The formatted data may later be used to represent a network communication session of request and response packets.

If the packet is a response packet, and there is a given file associated with the response packet, the data relating to the file is extracted, a reconstructed file created, and the data appended to that reconstructed file. If the given file is a script-type file, a name that represents the given file is appended to a script master list. Each packet is similarly analyzed and the data extracted and appended to the reconstructed file until the last response packet associated with the given file has been analyzed, at which point the reconstructed file is closed.

Next, the communication may be displayed on a computer monitor. This display may be merely a display of what the user saw in the communication, or, preferably, both the prior display and other information. Inclusion of control information permits better analysis of the network communication.

BRIEF DESCRIPTION OF THE DRAWINGS

Other features and advantages of the present invention will be apparent from the following Detailed Description taken in conjunction with the accompanying Drawings, in which.

DETAILED DESCRIPTION

According to the present invention, a method is provided that permits display of the content of actual web sessions and the ability to control the display of stored web sessions and other network communications. The method may be used to recreate files that were previously transported over a network or to recreate both previously stored and real-time network communications. In effect, network communications and files may be captured, reconstructed, and displayed as they appeared, or substantially as they appeared, in the original network communication session.

Figure 1:
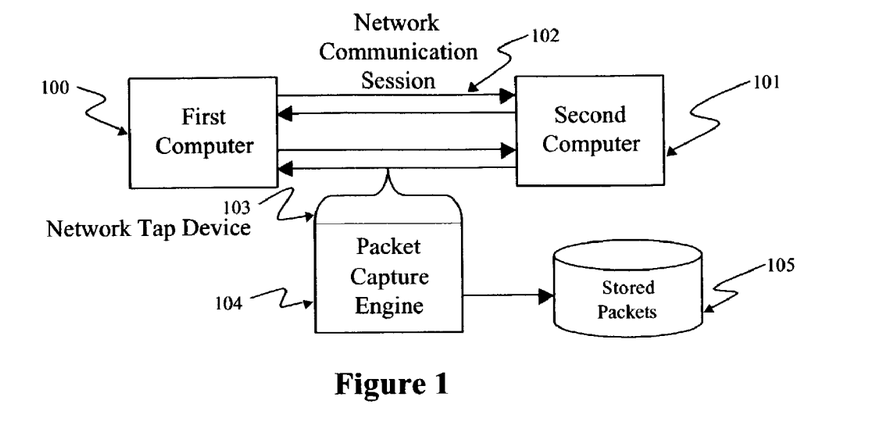
FIG. 1 depicts a packet capture engine in operation.

FIG. 1 depicts a network communication session 102 comprising multiple requests and responses between a first computer 100 and a second computer 101. Typically, network communications are conducted by transmitting packets of data across the network. The packets may contain both data to be transmitted as well as addressing, sequence and other process control information.

The first computer 100 sends a request to the second computer 101 by way of a packet or series of packets. A request packet is any packet that solicits a response, but also includes packets that initiate instant messaging, broadcast communications or other push technologies, or any other packet used to initiate a network communication. The second computer 101, which is typically a server computer, receives the packet or packets, decodes the request, and sends one or more response packets for the first computer 100 to receive, decode, and process. The first computer may then send additional requests, or the second computer may make requests to the first computer, thereby continuing the communication session, or the session may terminate.

To reconstruct the network communication session 102, the packets must first be captured as is known in the art. A network tap device 103, such as an Ethernet card set to promiscuous mode or a wireless network capture device, intercepts the packets being transmitted during the network communication session 102. A packet capture engine 104 captures the raw data packets being communicated during the network session 102. The captured packets are stored on a storage medium 105, which may be a hard drive, memory or other known storage device. The process of capturing network packets is known in the art. Capture engines may be software, firmware, or hardware. Commonly available software capture engines include the Sniffer from Network Associates, the Lanalyzer from Novell, a Linux program called Ethereal and EtherPeek from WildPackets.

Typically, the packets are captured in a chronological fashion without regard to content or type. All or some portion of the captured packets may be selected for sorting and processing. For instance, the portion may be selected by taking a block of packets captured during a specified time interval.

Figure 2:
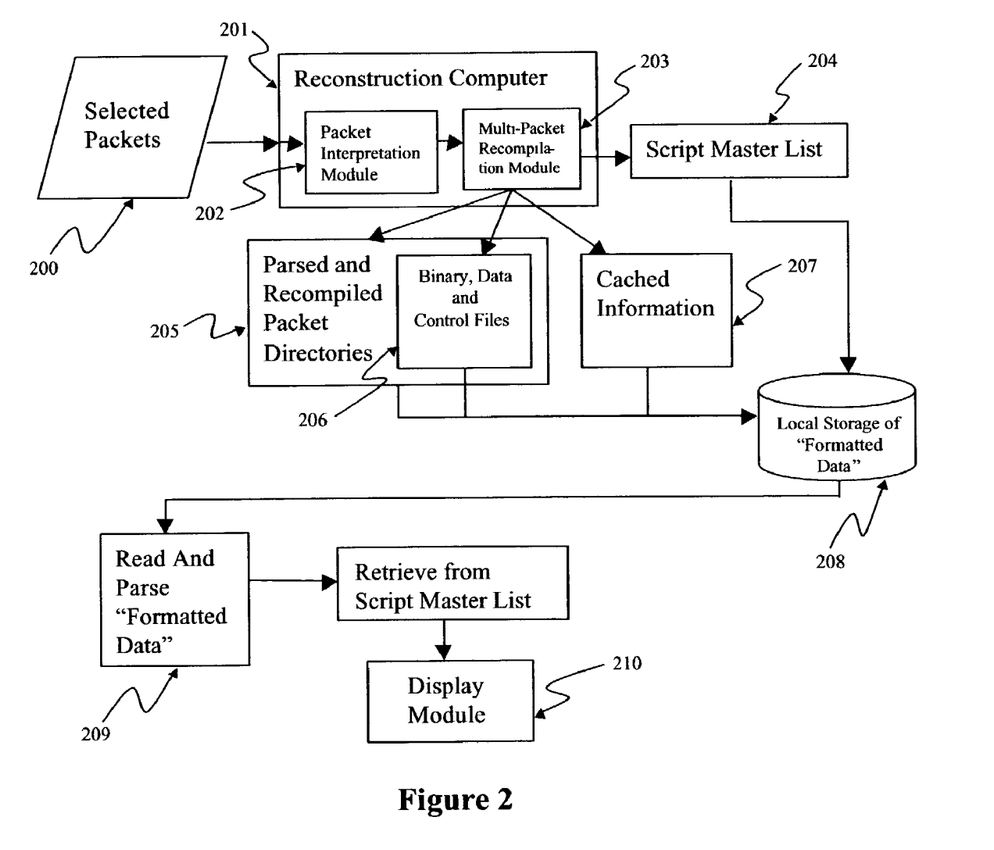
FIG. 2 depicts an overview of the reconstruction method and apparatus.
Figure 3:
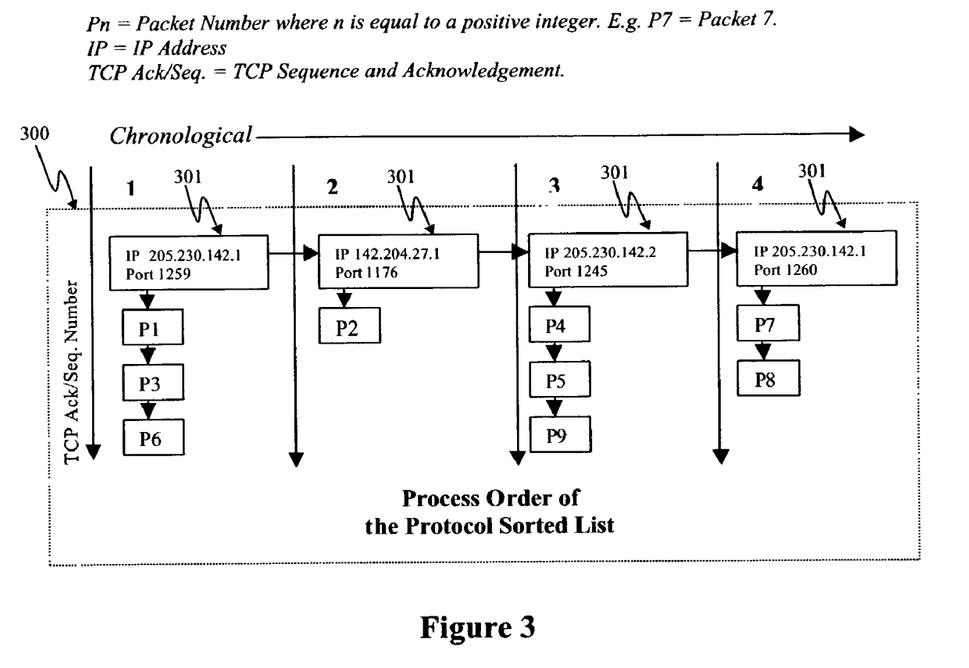
FIG. 3 shows a protocol sorted list of packets.

As depicted in FIGS. 2 and 3, the selected packets 200 are then sorted into a protocol sorted list 300 by a reconstruction computer 201 running a packet interpretation module 202. The selected packets 200 are retrieved from the storage medium 105. The packet interpretation module 202 decodes each of the selected packets 200 into its respective protocol. Typically, this will be a TCP/IP (Transmission Control Protocol/Internet Protocol) decode, as is known in the art.

Figure 4:
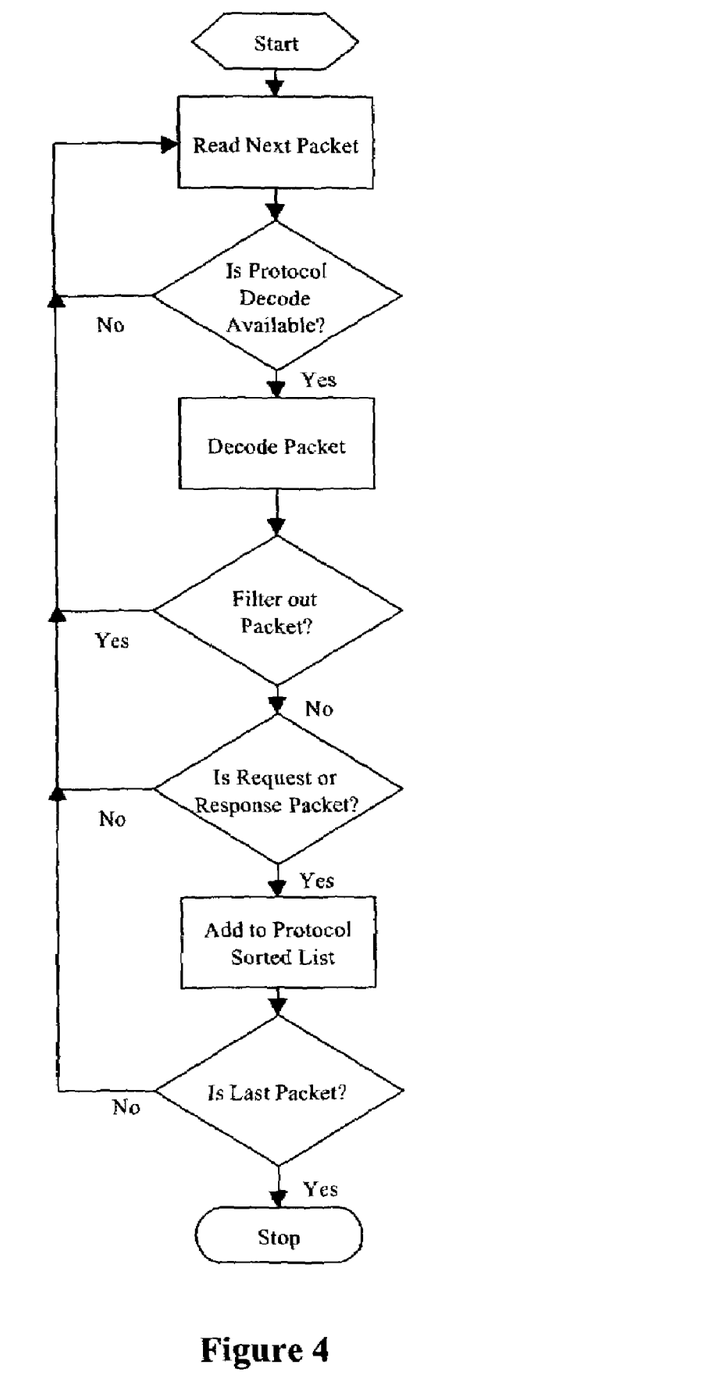
FIG. 4 depicts a flowchart of the sorting process for packets according to the method of the present invention.

FIG. 4 depicts a flow chart of the process for sorting the selected packets 200 into the protocol sorted list 300 as shown in FIG. 3, which depicts the protocol sorted list 300 including packets P1 through P9. A first packet P1 is read; if a decode for the protocol of the first packet P1 exists, the packet is decoded. If the first packet P1 is not needed for the subsequent reconstruction of the network communication session 102, the packet is not included in the protocol sorted list 300. For example, DNS (Domain Name Service) lookup request packets, error packets, or corrupted packets may not be included.

The first packet P1 is then checked to determine if it is either a request or response type packet. If it is a request or response packet, the first packet P1 is added to the protocol sorted list 300 based on the IP address and port number of the first packet. The next packet P2 is then read, decoded, checked to determine if it is a request or a response packet, and added to the protocol sorted list 300 based on the IP address and port number of the packet P2.

In the same fashion, each of the selected packets 200 are sequentially read, decoded, checked and added to the protocol sorted list 300 until the last packet has been retrieved, read, decoded, and added to the protocol sorted list. As depicted in FIG. 3, the protocol sorted list 300 groups the packets P1 through P9 from the selected packets 200 into a series of linked lists 301 based on the IP address and port number of the packets and in chronological order as the packets were received. Although it is presently believed preferable to sort the packets by IP address and port number, the selected packets 200 may be sorted by other indicators, such as port only or IP address only, the MAC (Media Access Control) address from the network interface card, the UDP (User Datagram Protocol) port and address, or an IPX/SPX address. Furthermore, although FIG. 3 illustrates HTTP request/response packets, other request/response, local network protocols, or Internet protocols may be used. Examples of such other protocols include Novell's IPX/SPX protocol, the secure HTTPS protocol, and the File Transfer Protocol ("FTP").

Once the selected packets 200 have been captured and sorted into the protocol sorted list 300, the data from the selected packets 200 may be reconstructed into data files and script files that will be used to display web pages and other content and information relating to the network communication session 102. The data from the packets is extracted from the raw data packets and used to recreate the files and directory structures indicated by the response to the request packets from the first computer 100. The data is stored in files that may be used by the reconstruction computer 201 to display a reconstruction of the network communication session 102. The data may also be stored in cache for expedited retrieval and to facilitate displaying the data.

Figure 5A:
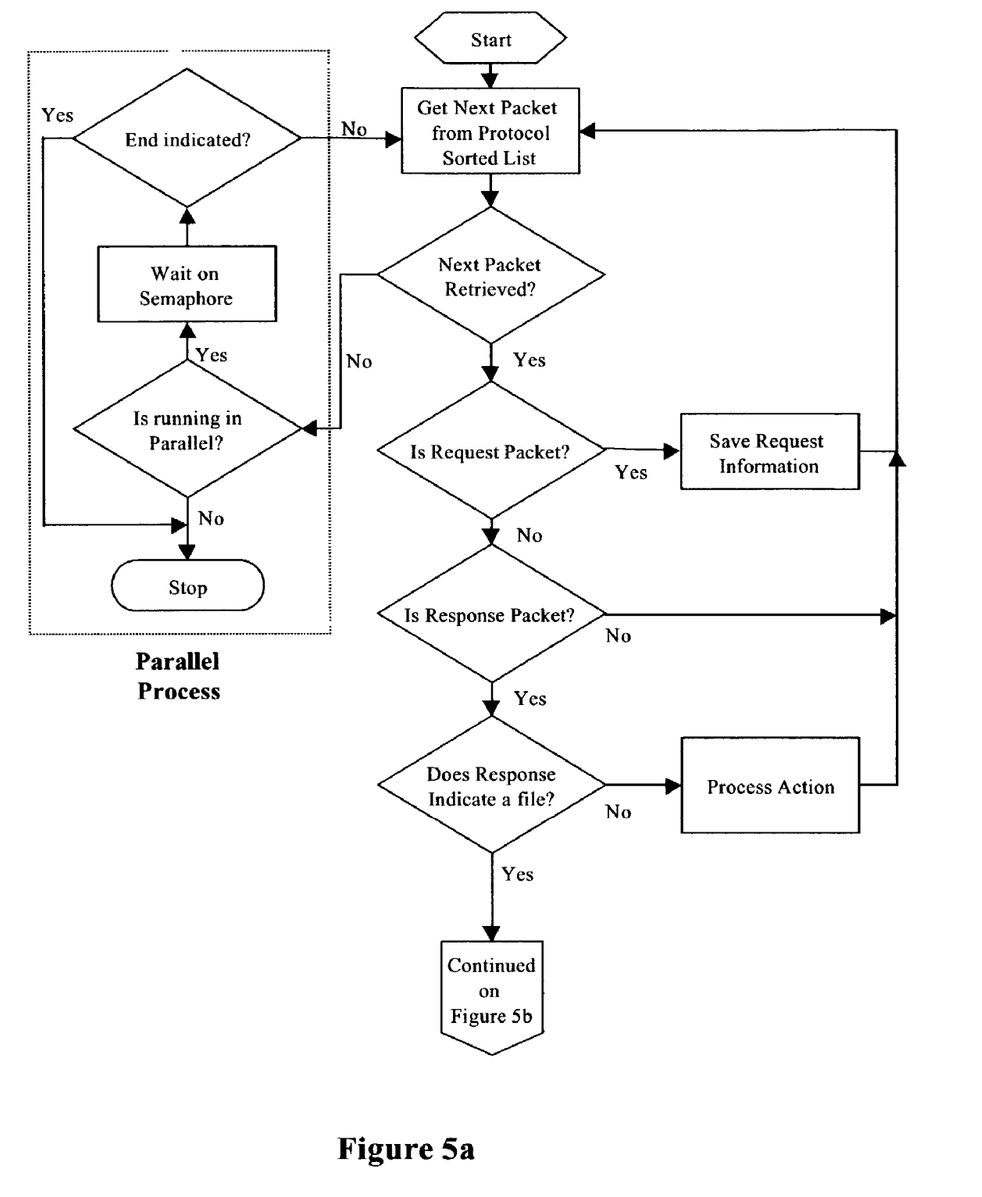
FIG. 5a is a flowchart showing the process of reconstructing files according to the method of the present invention.
Figure 5B:
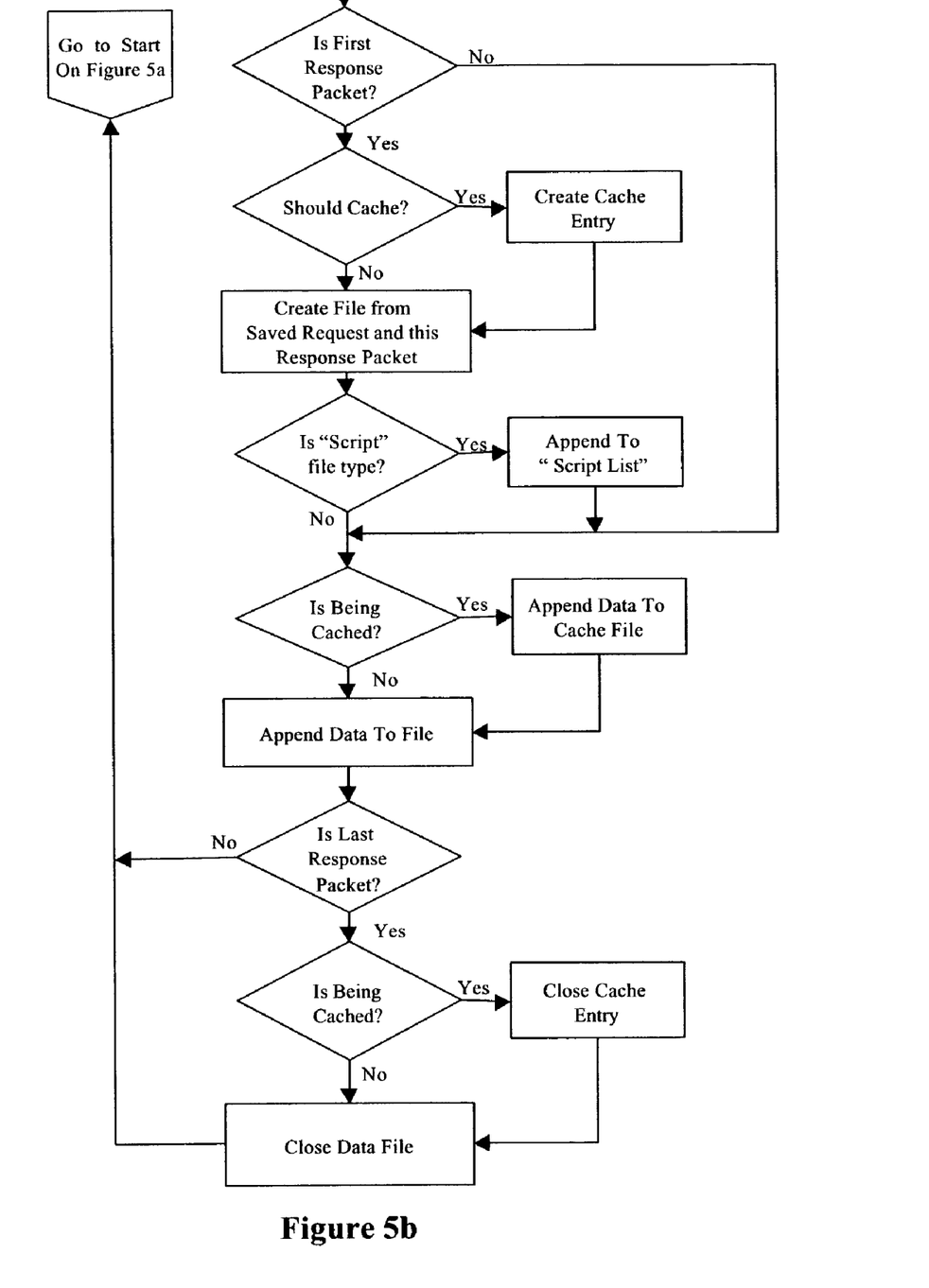
FIG. 5b is a flowchart continuing the process shown in FIG. 5a according to the method of the present invention.

As depicted in FIG. 2 and the flow charts shown in FIGS. 5a and 5b, the packet interpretation module 202 passes the data from the selected packets 200 to a multi-packet recompilation module 203. As depicted in FIG. 3, the multi-packet recompilation module 203 parses the protocol sorted list 300 beginning with a first identified IP address and port number 301. In chronological order, the first sorted packet P1 is parsed, and the multi-packet recompilation module 203 continues to subsequent packets P3 and P6 (as shown in FIG. 3) until all the packets associated with the first identified IP address and port number 301 have been parsed. The multi-packet recompilation module 203 then parses the packets of a second IP address and port number 301.

The multi-packet recompilation module 203 continues parsing until all of the IP addresses and port numbers 301 contained in the protocol sorted list 300 have been parsed. That is, as shown in FIG. 3, the packets P4, P5 and P9 associated with the third identified IP address and port number 301 are parsed by the multi-packet recompilation module 203, and the data from that parsing operation is used to recreate the specified files and directory structures from the network communication session 102. This process may require multiple passes to first determine the type of packets and to categorize packets in the list.

Thus, as shown in FIG. 5a, the multi-packet recompilation module 203 receives a first packet from the protocol sorted list 300. The multi-packet recompilation module 203 determines whether the first sorted packet is a request packet If so as shown in FIG. 5a, the request information from the packet is saved to a local data store 208 (because request packets may contain information that is useful in understanding response packets) as formatted data, and the multi-packet recompilation module 203 retrieves the next sorted packet. Formatted data in this context includes data structures, directory structures, HTML files, XML files, document files, or other such data structures and files. Typically, the entire request packet is retained in memory, although portions or all of the request information may be saved in storage, at least until all the response packets associated with that request have been processed.

If the sorted packet is not a request packet, the multi-packet recompilation module 203 determines if it is a response packet. If not, the multi-packet recompilation module 203 retrieves the next sorted packet.

As is known in the art, a response to a network communication request may comprise a single packet or multiple packets. The first response packet to any given request typically contains the response codes and information about the response. Any following response packets typically contain further information or data necessary to fulfill the request. For example, a request for an image file may receive an affirmative response and the following packets will contain the data comprising the actual image file.

If the sorted packet is a response packet, the multi-packet recompilation module 203 determines whether the response packet indicates a file with characteristics that need to be processed to reconstruct the network communication session 102. If so, the file is processed and saved as described below. If the response does not contain a file, the response is processed according to an interpretation of the data in the packet. Typically, this means that the packet is ignored or handled in the way a web browser or other display program would process it in a live network communication session.

For example, if the response is a redirect, it can usually be ignored as it is not essential to reconstruction of the network communication session, because a redirect causes a web browser to request information from different location. The new location will fulfill the request and the processing of that request will be accomplished at the time those packets are processed. The intermediate step of redirection, then, is usually not a visible aspect of the initial network communication session and thus there may be no need for the packet to be parsed or stored for later reconstruction.

If the response packet does indicate a file, as depicted in FIG. 5b, the response packet is checked to see if it is the first response packet for a given request. At this point in the process, it is known that the response packet is fulfilling a given request (otherwise it would have been processed at the previous junction). It is also known that this packet contains data relating to a file that needs to be saved.

If the response packet is the first response packet to a given request, the multi-packet recompilation module 203 determines whether data from the packet should be stored in a cache 207. If so, a cache entry is created. Typically, all files except files with script attributes would be saved to the cache 207 to expedite later retrieval. However, in a preferred embodiment, all the files are sent to cache.

In addition to caching the file data, a new file is opened based on the information obtained from the request packet and the first response packet, recreating, on the local data store 208, the directory structure that existed on the server computer from which the file was requested, as specified in the request packet and the first response packet. The new file is created under the directory that was just created, recreating the directory and file structures. In this embodiment, the file is only created in the directory, not in the cache. Data extracted from subsequent packets is appended to the file to complete its recreation.

The multi-packet recompilation module 203 next determines whether the first response packet indicates a "script" file type or has "script" attributes A file has script attributes if it has characteristics that allow it to be displayed as a web page. Examples of files with script attributes include HTML, Java Script and Active Server Pages (ASP).

If a script file type is indicated, the name of the file is appended to a script master list 204. The name is appended to keep the script files in chronological order, enabling reconstruction of the network communication session exactly as it occurred. Thus, the script master list 204 is used later to display Web pages in chronological order.

The response packet is then checked to see if the data from the packet is being cached. If so, the data is appended to the cache file previously created. In either case, the data is appended to the new file.

The multi-packet recompilation module 203 next determines whether the response packet is the last response packet. If it is not the last response packet, as indicated in FIG. 5b, the multi-packet recompilation module 203 retrieves the next packet and repeats these processing steps (that is, the process reverts to the START block shown in FIG. 5a). If the response packet is the last packet, a check is made to see if the file is being cached. If it is being cached, the cache entry is closed. In addition, the newly reconstructed file is closed and, if necessary, the process continues on to retrieve the next packet from the protocol sorted list 300. The multi-packet recompilation module 203 repeats this process until every request and response packet in the protocol sorted list has been processed (or filtered out) and the directory structures, files, and other data extracted and files have been recreated on the local data store 208.

To illustrate the directory structure that is created by the multi-packet recompilation module 203, a request packet may request an image from a directory on a web server. If the request packet indicates a directory on the remote server of (for example)/files/images/image.gif, the following directory will be created: X:/optional directories/files/images/image.gif, where X: refers to a local drive letter on the reconstruction computer 201 and "optional directories" refers to an optional set of subdirectories. For example, the actual path could be C:/files/images/image.gif or it could be D:/subdir1/files/images/image.gif.

During the reconstruction process using the multi-packet recompilation module 203, most files are added to the web browser's local cache 207. The local cache 207 holds data and information that the web browser would normally request from the web. A web browser checks the local cache for a copy of a file before attempting to retrieve the file from a remote source because retrieval from the local cache 207 is faster and does not require a network connection. In this embodiment, typically the files with script attributes are not cached so that they reference and are relative to the directory structure that was created as described above. Examples of files typically added to the cache include graphics files, such as GIF and JPEG images; text files such as word processing documents and PDF files; audio files; and video files. However, in an alternate, preferred embodiment of the invention, all files are cached and reconstruction of directories and files under those directories is not necessary.

The protocol sorted list 300 may have sorted packets added to it at the same time (in parallel) as it is reading the packet if the process that adds data to the protocol sorted list 300 is separate from the process that reads from the protocol sorted list 300. Accordingly, as further shown in FIG. 5*a*, if the multi-packet recompilation module 203 finds that no more packets are left to be parsed, the multi-packet recompilation module 203 checks to determine whether a parallel process may be adding additional packets to the protocol sorted list 300. In that case, the process may not stop, but simply wait on a semaphore (from the system or systems running in parallel) before reading the next sorted packet or set of sorted packets to ensure that all packets are retrieved in the proper order. If there is no parallel process adding additional packets, the multi-packet recompilation module 203 recognizes that the final packet in the protocol sorted list 300 has been received and the process terminates.

One difficulty in recreating a web session is that some of the files and information needed to recreate it are not transmitted over the network during a session. For example, files that have been cached by a web browser during a previous network communication session are often unavailable from a live session of captured packets. An optional addition to reconstructing web sessions is to use, a cache server 603.

Figure 6:
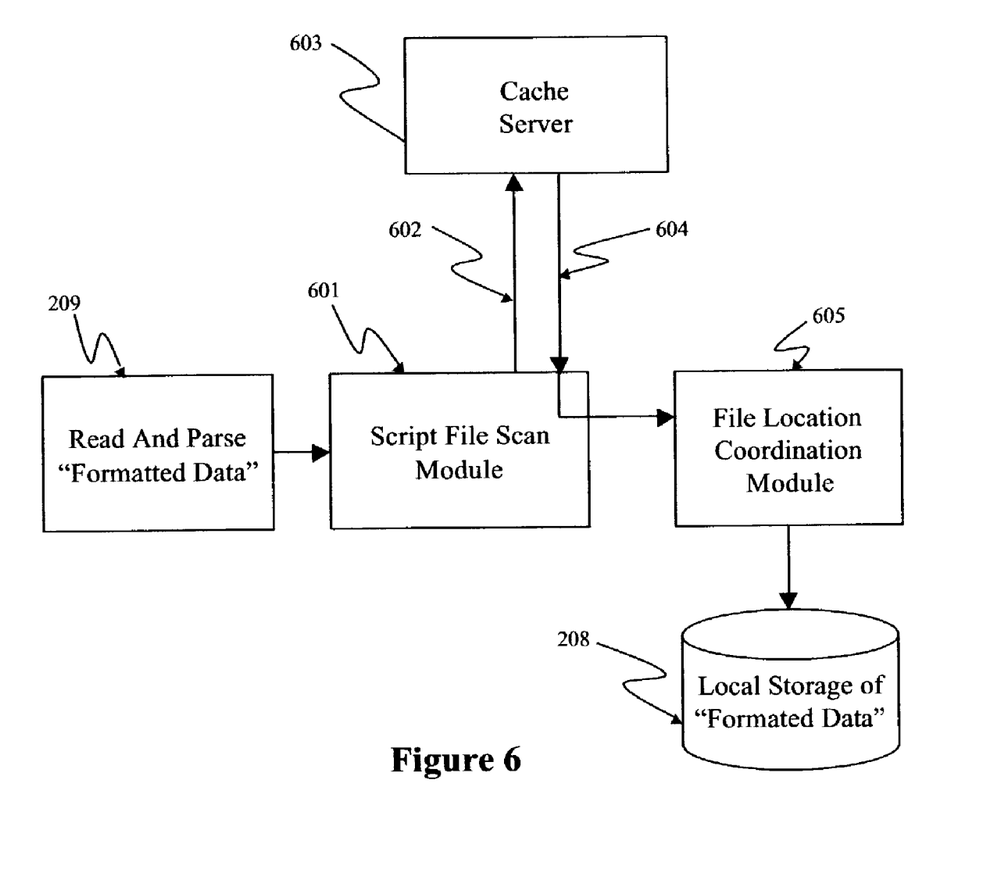
FIG. 6 depicts the use of a cache server according to an alternate embodiment of the method of the present invention.

FIG. 6 illustrates the use of a cache server 603. In this context, a cache server 603 is a separate computer that stores files from previous web sessions. Such a caching process begins by reading script files parsing the script files and passing them to the script file scan module 601. The script file scan module 601 identifies files needed for more complete reconstruction of a network communication, retrieves those files from the cache server 603, and adds those files to the local cache or to the directory structure for later display. The files may be stored indefinitely and therefore remain available for retrieval in response to a request that references a particular file, even if that file had been stored to cache during a prior session.

If, during reconstruction of a network communication session 102, a file is missing (for example, an image file that is needed to complete a Web page display), a request 602 is made to the cache server 603. A response 604 containing the requested file is returned to the script file scan module 601. In a successful response, the script file scan module 601 sends directory or URL location information along with the received file to a file location coordination module 605. The file location coordination module 605 then places the file in the local data store 208 or in local cache in the correct location, effectively reconstructing the directory and file structures in the same manner described above for non-cached files. The process then proceeds to use the script master list file location information to display the data as described below.

Thus, if a file is missing, a request to the cache server will determine if that file was stored during a prior session and can thus be recreated. By using the cache server, a more complete presentation of a web page or web session can be made.

Figure 7:
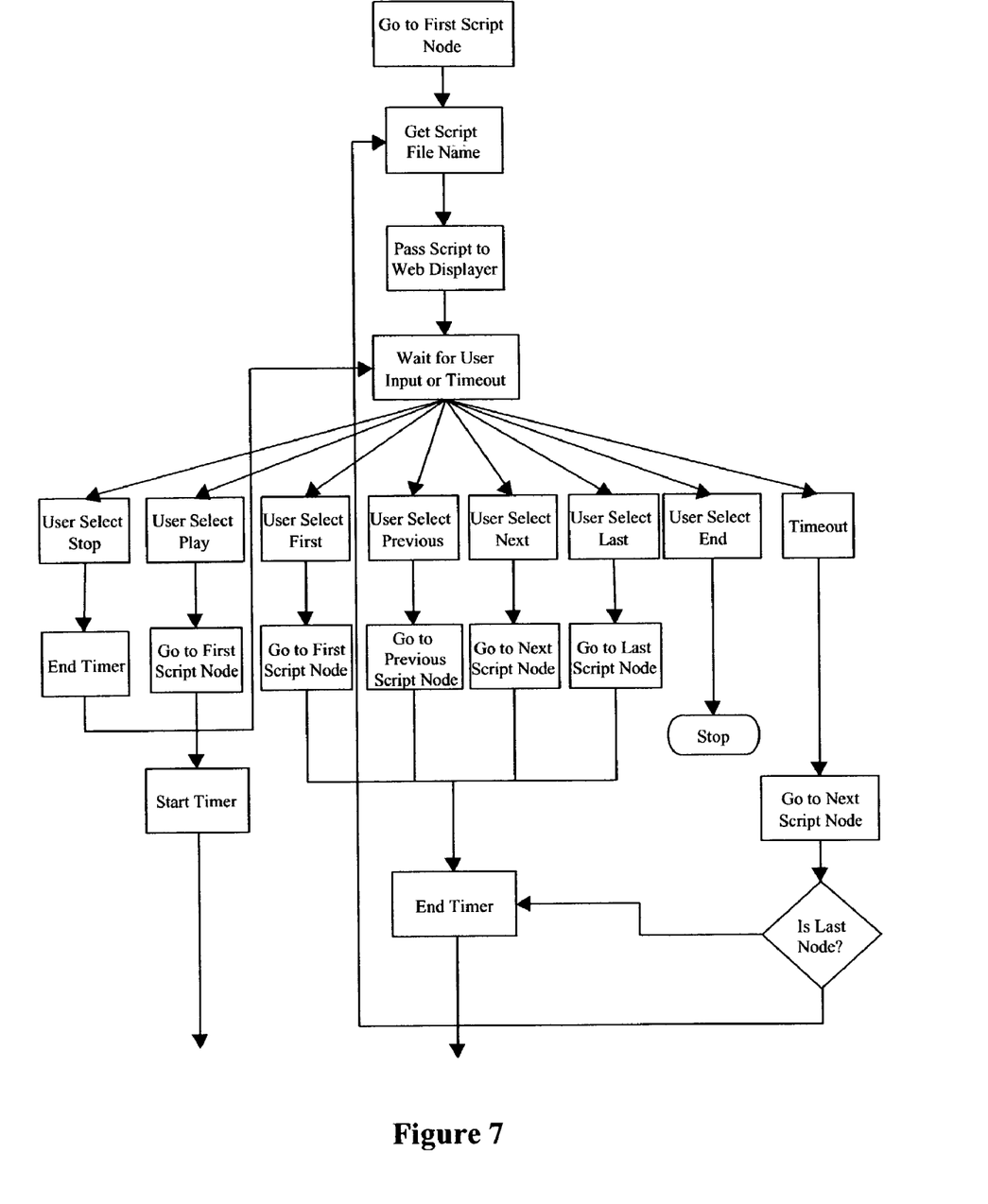
FIG. 7 depicts a flow chart of a display control system according to the method of the present invention.
Figure 8:
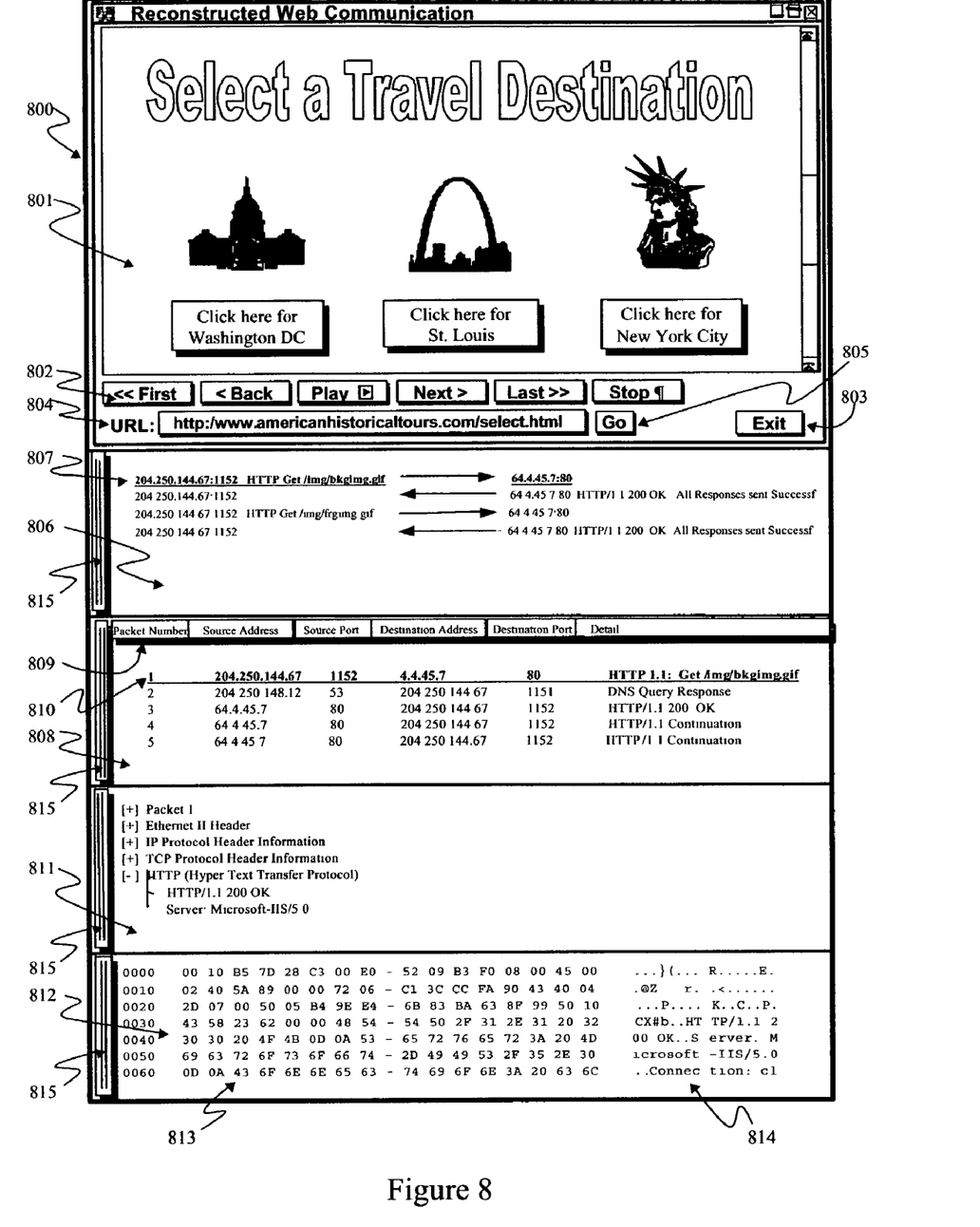
FIG. 8 depicts a graphical representation of how reconstructed information may be displayed according to one embodiment of the present invention.
Figure 9:
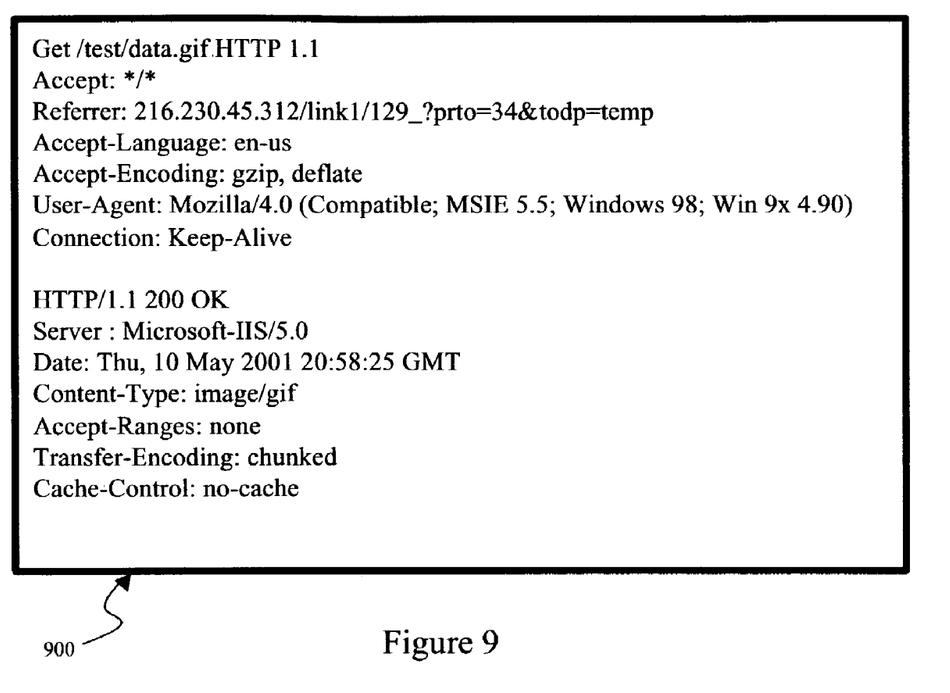
FIG. 9 depicts a graphical representation of how reconstructed information may be displayed according to an alternate embodiment of the present invention.

Once the selected packets 200 have been sorted, scanned, files recreated on the local data store 208, scripts added to the script master list 204 and so forth, the actual data may be displayed. FIGS. 7, 8 and 9 depict different methods of displaying a web page. As shown in FIG. 7, the display process begins by reading the first script from script master list 204. The retrieved script contains the location of a script file on the local storage device, such as C:/files/html files/ webpage.html or http://www.traxess.com/webpage.html.

A script file name is passed to a web browser or other display program capable of displaying text, graphics and other visual information on a computer monitor. The browser or other display program may also process stream data such as video or audio, which may require additional software (such as a video display program) or hardware (such as a sound card, amplifier, and speakers). The browser or display program then awaits a response from the user, or until a user-determined timeout occurs.

If a timeout occurs before any user response is made, a display module 210 retrieves the next script file name from the script master list 204, checks to see if it is the last script in the list, and loops back to read the script location and (using the display program) display the web page as described. If the script is the last item in the script master list 204, the timer is stopped and the system will wait indefinitely for user input after displaying the last page.

In one embodiment of the invention depicted FIG. 8, the user is provided with a series of command buttons 802 to be used to control the display process. In this embodiment, at any point during the display process, the user may select a command button 802 to control the display of the network communication session 102. For instance, the play command button 802 starts a timer and displays the web pages in a slide show format using pre-determined time intervals or the original viewer's time intervals as described below.

Other command buttons 802 allow the user to display the next page, previous page, first page, last page, or to stop the display (after the play command has been invoked) of the network communication session 102 in a manner analogous to the way a user controls a web browser during a live network communication session. The exit command button 803 allows the user to exit the display module 210. The URL edit box 804 and the go button 805 allow a user to specify specific reconstructed Web pages for display.

In another embodiment of the present invention, during the display process the display module 210 reads the time stamps associated with each packet retrieved from the stored packets. By reading and decoding those time stamps, the time interval between packets, and thus the interval between files reconstructed from those packets, may be computed. This time differential information may then be used instead of user defined commands or a time-out to automatically advance the display from page to page in the same order and using the same timing as in the original network communication session. Typically, such a sequence would be initiated by use of a play command button 802.

FIG. 8 illustrates how data that has been reconstructed could be displayed within a web browser or other display program. A master display 800 is produced by the display module 210 and includes display of various data related to the selected packets 200, script master list 204, and files saved to the local data store 208. As depicted in FIG. 8, the web page window 801 of the master display 800 is used to display a web page, as well as other data about the scripts and packets of a network communication session 102. The web page window 801 of the master display 800 is a scrollable area used to depict a full web page, if any, associated with the packets and scripts being displayed. As an example, FIG. 8 depicts an HTTP network communication session 102.

Beneath the web page window 801 is a session window 806 that displays the request and responses involved in the network communications session 102. The example shown in FIG. 8 depicts a high level graphic representation of a request and a response typical of an HTTP network communication session. In that example, a selected session 807 is synchronized with the web page window 801 and the currently selected packet or packets.

Beneath the session window 806 the master display 800 may contain a packet window 808, which is a one line description of a packet. A column bar 809 identifies the information being displayed in each packet, such as a serialized packet number, source address and port, destination address and port, and details concerning the nature and content of the packet. The column bar 809 may be configured by the user to add, delete rearrange or resize the various column descriptions.

FIG. 8 also depicts a packet decode window 811 that is used to present a decode of a selected packet 810. The user may select a [+] to expand the decode or a [−] to collapse the decode, as is typical in a hierarchical tree display. The user may also select information in any of the expanded limbs of the decode tree. When a user selects decoded information in the tree, the associated data is highlighted in a packet dump window 812 located beneath the packet decode window 811.

The packet dump window 812 allows the user to view the raw data associated with each packet. The packet dump window 812 displays a hexadecimal representation 813 of the data in a packet. A corresponding text representation 814 of the data is also displayed on the right side of the packet dump window 812.

When the user highlights a selected session 807 in the session window 806, the first packet associated with that session is selected and the web page window 801 displays the web page associated with the selected packet and session. The packet window 808 highlights the first packet associated with the session indicated by the selected session 807. As a result, the packet decode window 811 and packet dump window 812 are updated to display the relevant information about the first packet in the session.

At that point, a selected packet 810 may be highlighted within the packet window 808. If the selected packet 810 being highlighted is different from the packet being displayed in the packet decode 811 and the packet dump window 812, those two windows are updated to reflect the new selection. The user may also select information in the packet decode window 811 and the data contained in the selected packet will be highlighted within the packet dump window 812 in both the hexadecimal representation 813 and the corresponding text representation 814.

As a result, a user may quickly navigate through the sessions, web pages packets and data captured from the packets of the network communication session 102. If a user selects another web page for viewing the master display is updated by displaying the web page in the web page window 801 and the sessions associated with that web page in the session window 806. The first session becomes the selected session 807 and the other windows are updated accordingly.

Certain network communication sessions 102 may be represented in pre-interpreted textual format, such as HTML source. In those cases, as shown in FIG. 9, text describing the network communication session 102 is displayed in a text window 900. According to this embodiment of the invention, the text window 900 may replace the web page window 801 shown in FIG. 8, or may be shown in a separate window at the option of the user. The session window 806, packet window 808, packet decode window 811 and packet dump window 812 remain as described with reference to FIG. 8.

As depicted in FIG. 8, each of the session window 806, packet window 808, packet decode window 811 and packet dump window 812 preferably have a dockable bar 815 on the left side. The dockable bar 815 allows a user to move, remove, and "dock" that is, connect, the respective windows to the master display 800. A user may also render the display area as an independent window by double clicking on the dockable bar 815 or the user may close the window when it is no longer needed.

In an alternate embodiment of the invention, the web page window 801 may be displayed without the other windows shown in FIG. 8. In this embodiment, the web page window 801 acts as a stand-alone application for displaying a reconstructed network communication session 102. Such a stand-alone application may be a web browser, a word processor or graphics editing program capable of displaying HTML pages, or a custom display program.

In another embodiment of the present invention, the captured packets are processed, reconstructed, and displayed in real time. Thus, the network communication session 102 may be viewed by a third party virtually simultaneously with the live network communication session. The reconstructed files may also be simultaneously stored to allow the third, party to view the network communication session 102 again at any later time.

It will be obvious to those of skill in the art that the method described may be modified to produce different embodiments of the present invention. Thus, the present invention has several advantages over the prior art without sacrificing the advantages of the prior art. Although different embodiments of the invention have been illustrated and described, various modifications and changes may be made by those skilled in the art without departing from the spirit and scope of the invention.

The invention claimed is:

1. A method for reconstructing network communications comprising the steps of:

capturing network packets by: attaching a network capture device to a network;

using the network capture device to capture network packets as the packets are passed across the network;

storing the plurality of network packets on a first mass storage device in chronological order;

selecting a portion of the captured network packets based on a first predetermined set of criteria;

sorting the selected packets, by the steps of:

(a) reading a first packet from the selected packets;

(b) decoding the first packet;

(c) determining whether the first packet relates to a request or to a response;

(d) if the first packet relates to a request or to a response, adding the packet to a sorted list corresponding to a second predetermined set of criteria that are satisfied by the packet; and (e) repeating steps (a), (b), (c) and (d) on additional captured packets until all packets relating to the first predetermined set of criteria have been sorted;

recreating a predetermined network communication by the steps of:

(f) retrieving a packet in the sorted list that is associated with the predetermined network communication;

(g) determining whether the retrieved packet is a request packet or a response packet;

(h) if the retrieved packet is a request packet, storing request information as formatted data in a designated storage medium;

(i) if the retrieved packet is a response packet, determining whether there is a given file associated with the response packet;

(j) if the retrieved packet is the first response packet containing data from the given file and that is a response to at least one request packet, initiating reconstruction of the content from the given file into a reconstructed file;

(k) if the given file is a script-type file, appending a name that represents the given file to a script master list;

(l) appending data in the response packet that is related to the given file to the reconstructed file;

(m) determining whether the response packet is the last response packet associated with the given file;

(n) if the response packet is not the last response packet associated with the given file, retrieving the next packet from the sorted list and repeating steps (f) through (m) for all of the packets from the sorted list; and (o) if the response packet is the last response packet associated with the given file, closing the reconstructed file; and displaying on a computer monitor:

a hexadecimal representation of the content of at least one packet;

a decode of at least one packet;

a listing of packets associated with the network communication;

a visual representation of request and response packets associated with the network communication; and a composite visual reconstruction of any text or graphic information contained in at least one packet;

wherein the data from the first response packet is stored in a cache to expedite subsequent retrieval;

wherein the data from the first response packet is stored in the cache unless the data includes script attributes.

2. The method of claim 1 further comprising the step of providing a user with a means of controlling the display of the network communication.

3. The method of claim 1 further comprising the step permitting a user to control the display of the network communication by selecting a command to implement at least one of the following operations:

playing the script master list in chronological order;

playing the script master list in chronological order using a predetermined timing sequence;

stopping the playing of the script master list;

going to the next script in the script master list;

going to the previous script in the script master list;

going to the first script in the script master list;

going to the last script in the script master list; or going to a user-selected script in the script master list.

4. The method of claim 1 wherein the given file includes characteristics that must be processed in order to perform the reconstruction.

5. The method of claim 1 further comprising ignoring the response if the response is a redirect.

6. A method for reconstructing network communications comprising the steps of:

capturing network packets;

selecting a portion of the captured network packets based on a first predetermined set of criteria;

sorting the selected packets by a process comprising the steps of:

(a) decoding a first packet from the selected packets;

(b) if the first packet relates to a request or to a response, adding the packet to a sorted list corresponding to a second predetermined set of criteria that are satisfied by the packet; and (c) repeating steps (a) and (b) on additional captured packets until all packets relating to the first predetermined set of criteria have been sorted;

recreating a predetermined network communication by a process comprising the steps of:

(d) retrieving a packet in the sorted list that is associated with the predetermined network communication;

(e) if the retrieved packet is a request packet, storing request information;

(f) if the retrieved packet is a response packet having a given file associated therewith and tat is a response to at least one request packet, reconstructing the content from the given file into a reconstructed file;

(g) determining whether the response packet is the last response packet associated with the given file;

(h) if the response packet is not the last response packet associated with the given file, retrieving the next packet from the sorted list and repeating steps (d) through (g) for all of the packets from the sorted list; and (i) if the response packet is the last response packet associated with the given file, closing the reconstructed file; and displaying a representation of at least a portion of the network communication on a computer monitor;

wherein data from a first response packet is stored in a cache to expedite subsequent retrieval;

wherein the data from the first response packet is stored in the cache unless the data includes script attributes.

7. The method of claim 6 wherein the request information is stored as formatted data in a designated storage medium.

8. The method of claim 6 wherein if the retrieved packet is the first response packet containing the data from the given file, reconstruction of the content from the given file into a reconstructed file is initiated.

9. The method of claim 6 wherein, if the given file is a script-type file, a file name tat represents the given file is appended to a script master list.

10. The method of claim 6 wherein the packets are captured by a process comprising the steps of:

attaching a network capture device to a network;

using the network capture device to capture network packets as the packets are passed across the network; and storing the plurality of network packets on a first mass storage device in chronological order.

11. The method of claim 6 wherein the display step includes displaying at least one of:

a hexadecimal representation of the content of at least one packet; a decode of at least one packet;

a listing of packets associated with the network communication;

a visual representation of request mid response packets associated with the network communication; and a composite visual reconstruction of any text or graphic information contained in at least one packet.

12. A method for reconstructing network communications comprising the steps of:

selecting a plurality of network packets based on a first predetermined set of criteria;

sorting the selected packets into a sorted list;

recreating a network communication by a process comprising the steps of:

(a) retrieving a packet in the sorted list that is associated with the network communication;

(b) if the retrieved packet is a request packet, storing request information;
(c) if the retrieved packet is a response packet having a given file associated therewith and that is a response to at Least one request packet, reconstructing the content from the given file into a reconstructed file; and
(d) repeating steps (a) through (c) for all of the packets from the sorted list that are associated with the network communication;
wherein data from the response packet is stored in a cache to expedite subsequent retrieval;
wherein the data from the response packet is stored in the cache unless the data includes script attributes.

13. The method of claim 12 wherein the packets are sorted into the sorted list by a process comprising the steps of:
(e) decoding a first packet from the selected packets;
(f) if the first packet relates to a request or to a response, adding the packet to a sorted list corresponding to a second predetermined set of criteria that are satisfied by the packet; and
(g) repeating steps (e) and (f) on additional captured packets until all packets relating to the first predetermined set of criteria have been sorted.

14. The method of claim 12 wherein the process of recreating the network communication further comprises the steps of determining whether the retrieved packet is a request packet and, if so, storing any request information in a designated storage medium.

15. The method of claim 12 wherein the process of recreating the network communication further comprises the steps of determining whether there is a given file associated with the retrieved packet and, if so, reconstructing the content from the given file into a reconstructed file.

16. The method of claim 15 wherein the process of recreating the network communication further comprises the steps of determining whether the given file is a script-type file and, if so, appending a name that represents the given file to a script master list.

17. The method of claim 12 further comprising the steps of capturing network packets by:
attaching a network capture device to a network;
using the network capture device to capture network packets as the packets are passed across the network; and
storing the plurality of network packets on a first mass storage device in chronological order.

18. The method of claim 12 further comprising the step of displaying on a computer monitor at least one of:
a hexadecimal representation of the content of at least one packet;
a decode of at least one packet; a listing of packets associated with the network communication;
a visual representation of request and response packets associated with the network communication; and
a composite visual reconstruction of any text or graphic information contained in at least one packet.

19. The method of claim 18 further comprising the step of providing a user with a means of controlling the display of the network communication.

20. The method of claim 18 further comprising the step of permitting a user to control the display the network communication by selecting a command to implement at least one of the following operations:
playing the script master list in chronological order;
playing the script master list in chronological order using a predetermined timing sequence;
stopping the playing of the script master list;
going to the next script in the script master list;
going to the previous script in the script master list;
going to the first script in the script master list;
going to the last script in the script master list; or
going to a user-selected script in the script master list.

21. The method of claim 12 wherein the reconstructed file is stored in the cache.

22. A method for reconstructing network communications, comprising:
selecting a plurality of network packets;
sorting the selected packets into a sorted list; and
recreating a network communication by:
retrieving a packet in the sorted list that is associated with the network communication,
if the retrieved packet is a request packet, storing request information, and
if the retrieved packet is a response packet that is a response to at least one request packet, reconstructing content associated with the retrieved packet;
wherein data from the response packet is stored in a cache to expedite subsequent retrieval;
wherein the data from the response packet is stored in the cache unless the data includes script attributes.

23. A computer program product embodied on a computer readable medium for reconstructing network communications, comprising:
computer code for selecting a plurality of network packets;
computer code for sorting the selected packets into a sorted list; and
computer code for recreating a network communication by:
retrieving a packet in the sorted list that is associated with the network communication,
if the retrieved packet is a request packet, storing request information, and
if the retrieved packet is a response packet that is a response to at least one request packet, reconstructing content associated with the retrieved packet;
wherein data from the response packet is stored in a cache to expedite subsequent retrieval;
wherein the data from the response packet is stared in the cache unless the data includes script attributes.

24. A system for reconstructing network communications, comprising:
a network analyzer for selecting a plurality of network packets, sorting the selected packets into a sorted list, and recreating a network communication;
wherein the network communication is recreated by retrieving a packet in the sorted list that is associated with the network communication, storing request information if the retrieved packet is a request packet, and reconstructing content associated with the retrieved packet if the retrieved packet is a response packet that is a response to at least one request packet;
wherein data from the response packet is stored in a cache to expedite subsequent retrieval;
wherein the data from the response packet is stored in the cache unless the data include script attributes.

25. A system for reconstructing network communications, comprising:
means for selecting a plurality of network packets,
means for sorting the selected packets into a sorted list, and
means for recreating a network communication;

wherein the network communication is recreated by retrieving a packet in the sorted list that is associated with the network communication, storing request information if the retrieved packet is a request packet, and reconstructing content associated with the retrieved packet if the retrieved packet is a response packet that is a response to at least one request packet;

wherein data from the response packet is stored in a cache to expedite subsequent retrieval;

wherein the data from the response packet is stored in the cache unless the data includes script attributes.

26. A method for displaying a reconstructed network communication, comprising:

acquiring packets associated with a network communication;

displaying a hexadecimal representation associated wit at least one of the packets;

displaying a decode associated with at least one of the packets;

displaying a listing of the packets associated with the network communication and displaying a visual representation of request packets and response packets associated with the network communication;

wherein a network analyzer selects a plurality of the packets, sorts the packets into a sorted list, and recreates the network communication;

wherein the network communication is recreated by retrieving a packet in the sorted list that is associated with the network communication, storing request information if the retrieved packet is a request packet, and reconstructing content associated with the retrieved packet if the retrieved packet is a response packet that is a response to at least one request packet;

wherein data from the response packet is stored in a cache to expedite subsequent retrieval;

wherein the data from the response packet is stored in the cache unless the data includes script attributes.

27. The method of claim 26 further comprising displaying a composite visual reconstruction of at least one of text information and graphic information contained in at least one of the packets.

28. The method of claim 26 further comprising displaying command buttons which allow a user to display least one of a next page, a previous page, and a first page associated with the visual representation of the request and the response packets.

29. The method of claim 26 further comprising an exit command button that allows a user to exit the display of the visual representation of the request packets and the response packets.

30. The method of claim 26 wherein the visual representation of the request packets and the response packets is displayed according to a timing of an original network communication associated with the reconstructed network communication.

31. The method of claim 30 wherein the timing is determined according to a time stamp associated with each request packet and response packet which is read and decoded to identify a time interval between packets in the original network communication.

32. The method of claim 30 wherein the visual representation displayed according to the timing of the original network communication is only displayed upon a selection of a play command by a user.

33. A method for permitting a user to control the display of a network communication, comprising:

capturing a plurality of network communications between a first computer and a second computer;

playing a script master list in chronological order by displaying the captured network communications in the chronological order;

stopping the playing of the script master list;

going to a next script in the script master list; and going to a previous script in the script master list;

wherein a network analyzer selects a plurality of network packets, sorts the network packets into a sorted list, and recreates the network communications;

wherein each of the network communications is recreated by retrieving a packet in the sorted list that is associated with the network communication, storing request information if the retrieved packet is a request packet, and reconstructing content associated with tho retrieved packet if the retrieved packet is a response packet that is a response to at least one request packet;

wherein data from the response packet is stored in a cache to expedite subsequent retrieval;

wherein the data from the response packet is stored in the cache unless the data includes script attributes.

34. The method of claim 33 further comprising going to a first script in the script master list.

35. The method of claim 33 further comprising going to a last script in the script master list.

36. The method of claim 33 further comprising going to a user-selected script in the script master list.

37. The method of claim 33 further comprising playing the script master list in chronological order using a predetermined timing sequence.

38. The method of claim 33 wherein the captured network communications include web pages.

* * * * *

UNITED STATES PATENT AND TRADEMARK OFFICE
CERTIFICATE OF CORRECTION

PATENT NO. : 7,277,957 B2  Page 1 of 1
APPLICATION NO. : 10/191933
DATED : October 2, 2007
INVENTOR(S) : Rowley et al.

It is certified that error appears in the above-identified patent and that said Letters Patent is hereby corrected as shown below:

col. 11, line 36 insert --of-- before "permitting" and after "step";
    col. 12, line 12 replace "tat" with --that--;
    col. 12, line 48 replace "tat" with --that--;
    col. 12, line 54 replace "mid" with --and--;
    col. 13, line 5 replace "Least" with --least--;
    col. 14, line 43 replace "stared" with --stored--;
    col. 14, line 60 replace "include" with --includes--;
    col. 15, line 16 replace "wit" with --with--;
    col. 15, line 21 replace "communication" with --communication;--;
    col. 15, line 44 insert --at-- before "least" and after "display";
    col. 16, line 32 replace "tho" with --the--.

Signed and Sealed this

Second Day of February, 2010

David J. Kappos
*Director of the United States Patent and Trademark Office*